United States Patent [19]
Smoot

[11] Patent Number: 5,940,139
[45] Date of Patent: Aug. 17, 1999

[54] BACKGROUND EXTRACTION IN A VIDEO PICTURE

[75] Inventor: Lanny Starkes Smoot, Morris Township, N.J.

[73] Assignee: Bell Communications Research, Inc., Morristown, N.J.

[21] Appl. No.: 08/725,346

[22] Filed: Oct. 1, 1996

Related U.S. Application Data

[60] Provisional application No. 60/023,796, Aug. 7, 1996.

[51] Int. Cl.[6] .............................. H04N 9/74; H04N 9/76
[52] U.S. Cl. ...................... 348/584; 382/165; 382/162; 382/163; 382/224
[58] Field of Search ................................ 348/584, 586, 348/587, 589, 590, 591, 592, 594, 595, 596, 597, 598, 601, 722, 661, 239; 382/165, 162, 163, 224, 282, 283; H04N 9/74, 9/76

[56] References Cited

U.S. PATENT DOCUMENTS 4,393,394  7/1983  McCoy ..................................... 348/722
5,400,081  3/1995  Chaplin ................................... 348/592
5,566,251  10/1996  Hanna et al. ............................ 348/588
5,574,511  11/1996  Yang et al. ............................. 348/586

*Primary Examiner*—John K. Peng
*Assistant Examiner*—Paulos M. Natnael
*Attorney, Agent, or Firm*—Joseph Giordano; David A. Hey

[57] ABSTRACT

A novel video object extraction has a first object 12, such as a foreground object, illuminated with visible light 16 and a second object 14, such as a background object, illuminated with a combination of infrared 18 and visible light 16. A novel camera system observes the scene. The novel camera system includes an infrared light camera 24 and a visible light camera 20. The infrared light camera output 24 contains bright images of the second object 14, with relatively little brightness of the first object 12. The signal from this infrared light camera 20, once thresholded, serves as a key to remove the second object 14 from the video image captured by the visible light camera 20.

24 Claims, 5 Drawing Sheets

BACKGROUND EXTRACTION IN A VIDEO PICTURE

RELATED PROVISIONAL APPLICATION

This application claims the benefit of U.S. Provisional Application Ser. No. 60/023,796, filed on Aug. 7, 1996 and entitled "A System and Method for Background Extraction". The content of this provisional application is incorporated herein by reference.

BACKGROUND OF THE INVENTION

1. Field of the Invention

The present invention relates to photography and, more particularly, to extracting objects from a composite scene being shot by a video camera. Extraction may be achieved by lighting a first object (such as a foreground object) in visible light and lighting a second object (such as a background object) in infrared and visible light. A visible light camera and an infrared light camera are used in the video shoot. The infrared light camera output is used as a key for object extraction. If the second object, for example, is not desired in the scene, the infrared light camera output is used as a key to remove the second object from the visible light camera output. If the second object is extracted, it may be replaced by another video or graphic image.

2. Discussion of Related Art

In video scenes in which multiple objects are being imaged, it is often advantageous to separate the image of a first object, such as a live person or other object from the scene. It is also desirable to accomplish this removal without altering the existing arrangement of objects in the scene.

One current object extraction practice, called "blue-screening", uses a monochromatic (often blue) background mounted behind the object (often a person) whose background is to be removed. The foreground objects are imaged against this monochromatic background by a video camera. The output of the video camera is then applied to a processing circuit which "keys" on the blue signal and removes it from the image, replacing it on a pixel by pixel basis with the video image from some other video signal. The final composite image appears to have the foreground objects in the original scene superimposed over the video from a completely different scene. One well known example of "blue-screening" is a TV weatherperson superimposed over a video view of a weather map.

One problem with "blue-screening" and other currently known color-keying extraction techniques, however, is that the scene needs a physical, monochromatic background. Thus, an "on-location" broadcast cannot use this extraction method unless a portable blue screen is available to place behind the foreground object (such as a newscaster). In addition, the background color cannot be present in the foreground object because the color is treated in the same manner as the background—it is removed. Thus, the blue-screen technique typically requires the foreground object, such as a newscaster, to be present in a studio or other specially prepared room. Also, the foreground object or any other portion of the foreground scene is restricted in usable color schemes (e.g., blue cannot appear). Television weather forecasters being blue-screened, for instance, cannot wear blue and must stand in front of a blue screen.

The problem is exacerbated in the case of extracting backgrounds behind participants in a video conference. For instance, in a multi-point video conferencing system such as may be accomplished using Bellcore's Proprietary Personal Presence System (described in U.S. patent Application Ser. Nos. 08/434,081 entitled "System and Method for Associating Multimedia Objects"; 08/434,083 entitled "Infinitely Expendable Real-Time Video Conferencing System" now U.S. Pat. No. 5,737,011, Apr. 7, 1996; and 08/432,242 entitled "Real-Time Video Conferencing System and Method with Multilayer Keying of Multiple Video Images" now U.S. Pat. No. 5,657,096, Aug. 12, 1997; all assigned to the assignee of this invention and all filed on May 3, 1995. The contents of these applications are incorporated herein by reference), multiple conferees engaged in a video conference can see the images of any, or all, of the other conferees on their viewing screens. Users may also customize their views of other conferees.

Video conferencing users may want the ability to remove the images of selected other conferees from their backgrounds. For instance, a user may wish to overlay just the conferees, without their backgrounds, on a common video background, thus providing the image that those conferees are all in the same room. A problem arises when conferee A wants to remove conferee B from his background, while conferee C wants to see conferee B's natural background. This is not possible with conventional blue-screen techniques. This is because, for example, if B appears in front of a blue screen to accommodate A, B's natural background is obscured by the blue screen, thus preventing C from seeing B's background.

A video conferencing user or picture phone user may desire to conceal the background from another conferee or caller for privacy reasons. Using conventional methods, the user must have a physical, monochrome background to conceal the background. This may be impractical, particularly for a picture phone located in a home.

Thus, it is an object of the present invention to permit a teleconference participant to choose freely how other conferees are viewed, including what background is displayed.

It is another object of the present invention to provide object extraction wherein the foreground object color scheme (such as dress and/or color content of persons or objects being video imaged) is unrestricted.

It is yet a further object of the present invention to provide object extraction that does not require the foreground object to be placed in front of a monochromatic background, thus permitting object extraction in "on-location" and other types of video shoots where it may be difficult or inconvenient to provide a physical, monochromatic background.

SUMMARY OF THE INVENTION

These and other objects of the present invention are provided by a novel video scene object extraction technique. A video scene has at least a first and a second object. The first object is illuminated with light having a first wavelength spectrum (such as visible light). The second object is illuminated with a combination of light having the first wavelength spectrum light and light having a second, different wavelength spectrum (such as infrared light). A novel camera system observes the scene. The novel camera system preferably includes a first wavelength spectrum light sensor and a second wavelength spectrum light sensor. The second wavelength spectrum light sensor output contains bright images of the second object illuminated with the second wavelength spectrum light, and dark images of the first object not illuminated with the second wavelength spectrum light. The signal from this second wavelength spectrum light sensor is thresholded to create a mask signal. This mask signal serves as a key to remove objects from the video image captured by the first wavelength spectrum light sensor.

Preferably, the present invention provides: (1) two sets of scene lighting, a first emitting visible light, and a second emitting infrared light; and (2) two separate video cameras, a first sensitive to visible light energy only, and a second sensitive to infrared light only.

In a first preferred embodiment, a first object is illuminated with visible light and a second object is illuminated with visible light and infrared light. Two cameras are set up with a beam-splitting optical system delivering substantially an identical view of the composite scene to both cameras.

The visible light camera images the scene substantially the way that a human observer would in natural light, because it is unaffected by infrared light energy. The infrared light camera images the scene with a bright image of a second object illuminated by infrared light and a very dark image of the first object not illuminated by infrared light. By thresholding the video signal coming from the infrared light camera, a two-valued "matte", or keying mask, may be made. The "matte" has a first video value (e.g., a high or "white" value) for portions of the scene where IR light is present and all of a second value (e.g., low or "black" value) for portions of the scene where IR light is substantially absent. Using a gating step, the IR thresholded image can be used to gate portions of the visible spectrum image, and effectively separate the first object from the second object in the visible light image.

In a second preferred embodiment, a single camera is provided having both a visible light sensor and an IR light sensor and a beam splitter which directs the visible and IR lights to the appropriate sensors.

BRIEF DESCRIPTION OF THE DRAWINGS

The present invention is described with reference to the following figures.

DETAILED DESCRIPTION OF PREFERRED EMBODIMENTS

This description is organized as follows. An overview of the invention is provided with reference to FIGS. 1 through 6. The cameras used in the inventive method are described with reference to FIGS. 1 and 1A. A comparator used for thresholding is described with reference to FIGS. 4 and 5. A video gate for combining a foreground and a background is described with reference to FIGS. 6 and 7.

I. Overview of the Invention

Figure 1:
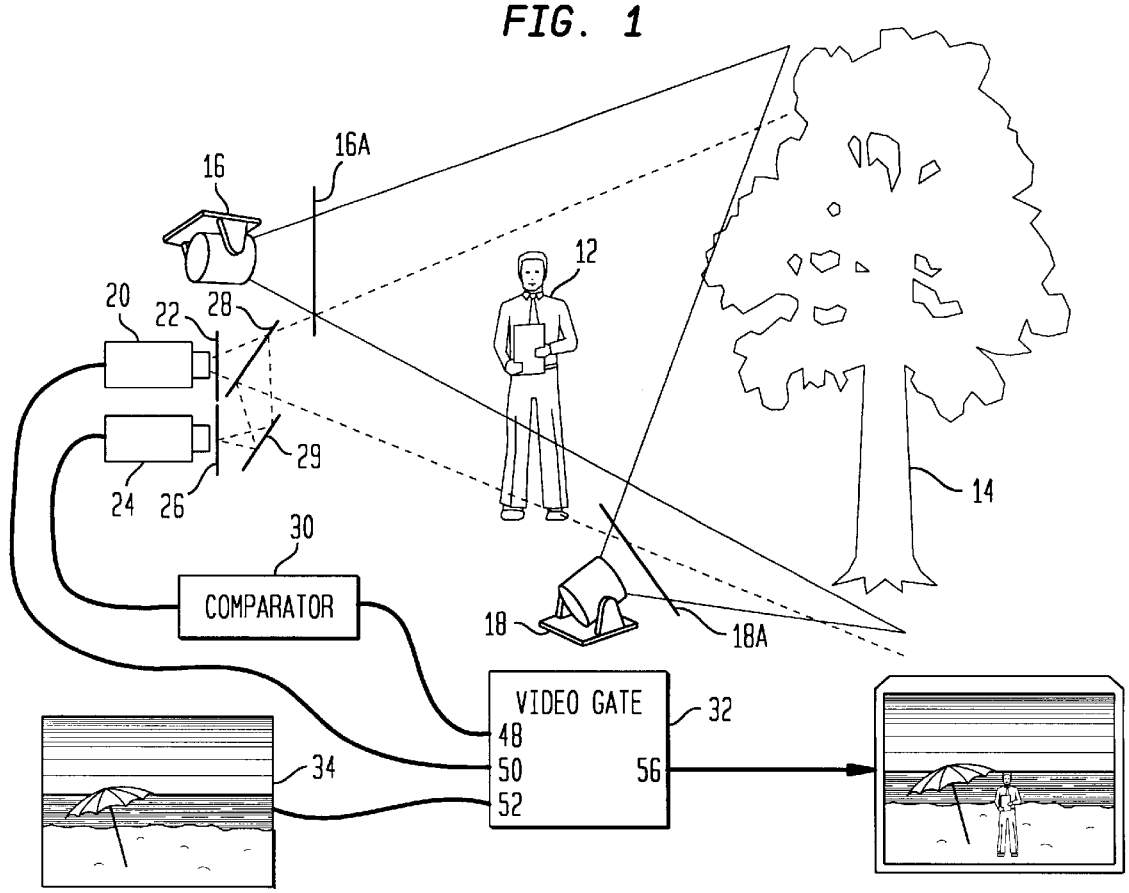
FIG. 1 illustrates a preferred embodiment of the background extraction system according to the present invention.

FIG. 1 depicts a first preferred embodiment of an inventive background extraction technique according to the present invention. In the scene shown in FIG. 1, a person 12 is a first object and a tree 14 is a second object. In this illustrative embodiment, the tree 14 is the object which may be removed from a composite scene if desired.

One or more first wavelength spectrum light sources 16 illuminate the first and second objects 12, 14. In a preferred embodiment, the first wavelength spectrum light source 16 is a visible light source. (Note that it is possible, but not preferable, for the visible light source to be natural or ambient light.) One or more second wavelength spectrum light sources 18 illuminate only the second object 14. The second wavelength spectrum is preferably any spectrum having a different wavelength spectrum from the first wavelength spectrum. In a preferred embodiment, the second wavelength spectrum is infrared light. The present invention is described using visible and infrared light. A person skilled in the art, however, readily appreciates that any two disparate wavelength energy spectrums may be used. An optional IR pass filter(s) 18A can be used to remove the visible light component from the IR source 18 if this source emits substantial visible light energy (such as is the case with an ordinary incandescent light bulb). Similarly, an optional IR blocking filter(s) 16A may be used to block infrared light energy emitted by the visible light source 16.

The inventive system also preferably includes a visible light (e.g., first wavelength spectrum) camera 20, having an infrared light blocking filter 22, and an infrared light (e.g., second wavelength spectrum) camera 24, having a visible light blocking filter 26. A beam splitter is interposed between the two cameras 20, 24. The beam splitter may be any suitable beam splitting device. FIG. 1 shows a combination of an optical beam splitter 28 and an inverting (or erecting) mirror 29. A person skilled in the art recognizes that any optical beam splitting device may also be used. For example, the inverting mirror 29 may be removed and the infrared camera 24 may electronically invert the image.

Figure 2:
FIG. 2 illustrates an output of a visible light camera of FIG. 1.
Figure 3:
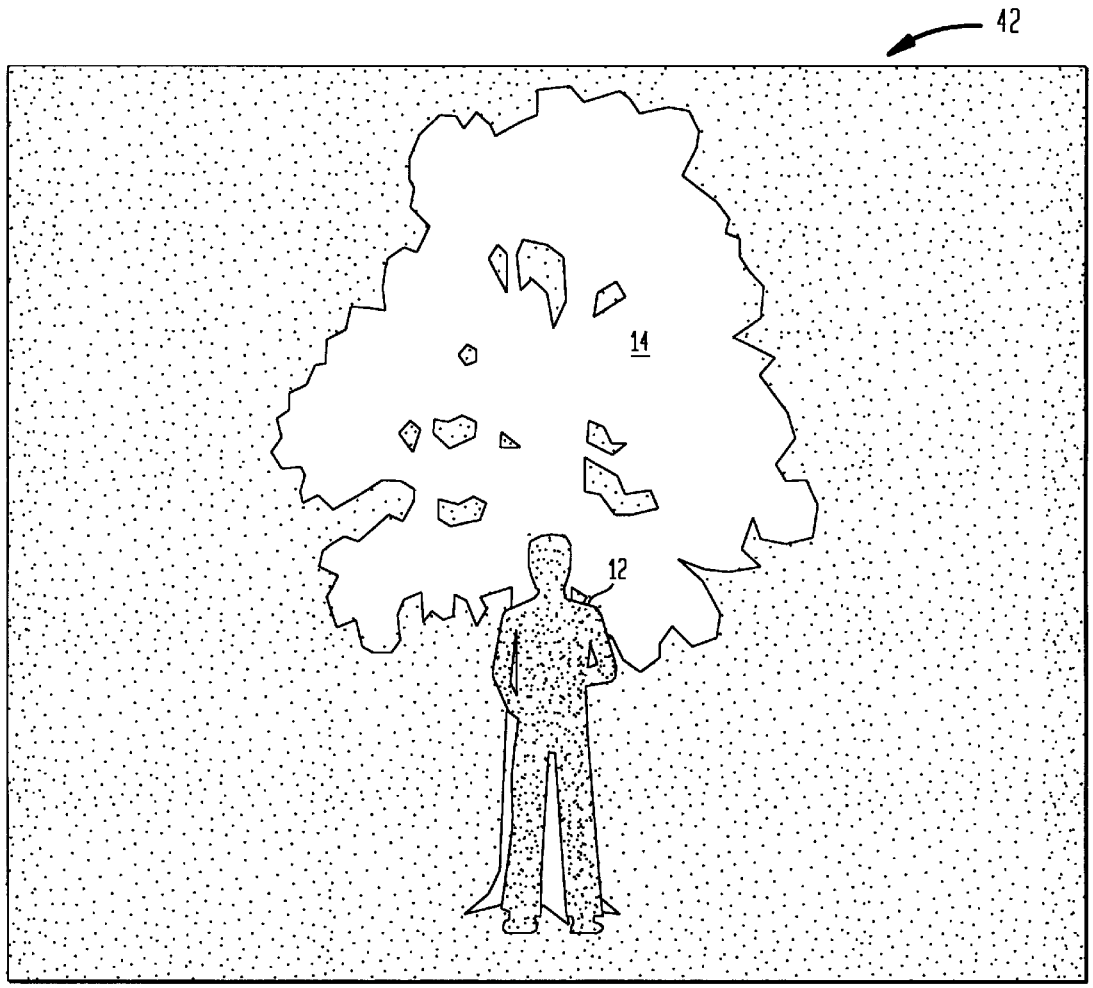
FIG. 3 illustrates an output of an infrared light camera of FIG. 1.

FIG. 2 illustrates a video signal 40 generated by visible light camera 20 showing all areas illuminated with visible light. FIG. 3 illustrates the video signal 42 generated by IR camera 24. Note that the IR video signal 42 has a high contrast image with the second object 14 appearing very bright (because it is illuminated with IR light), and the first object 12 appearing very dark (because there is very little IR energy illuminating first object 12).

Figure 4:
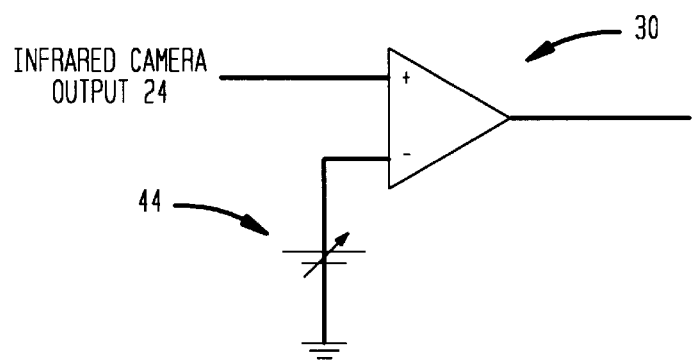
FIG. 4 is a schematic diagram of the comparator of FIG. 1.
Figure 5:
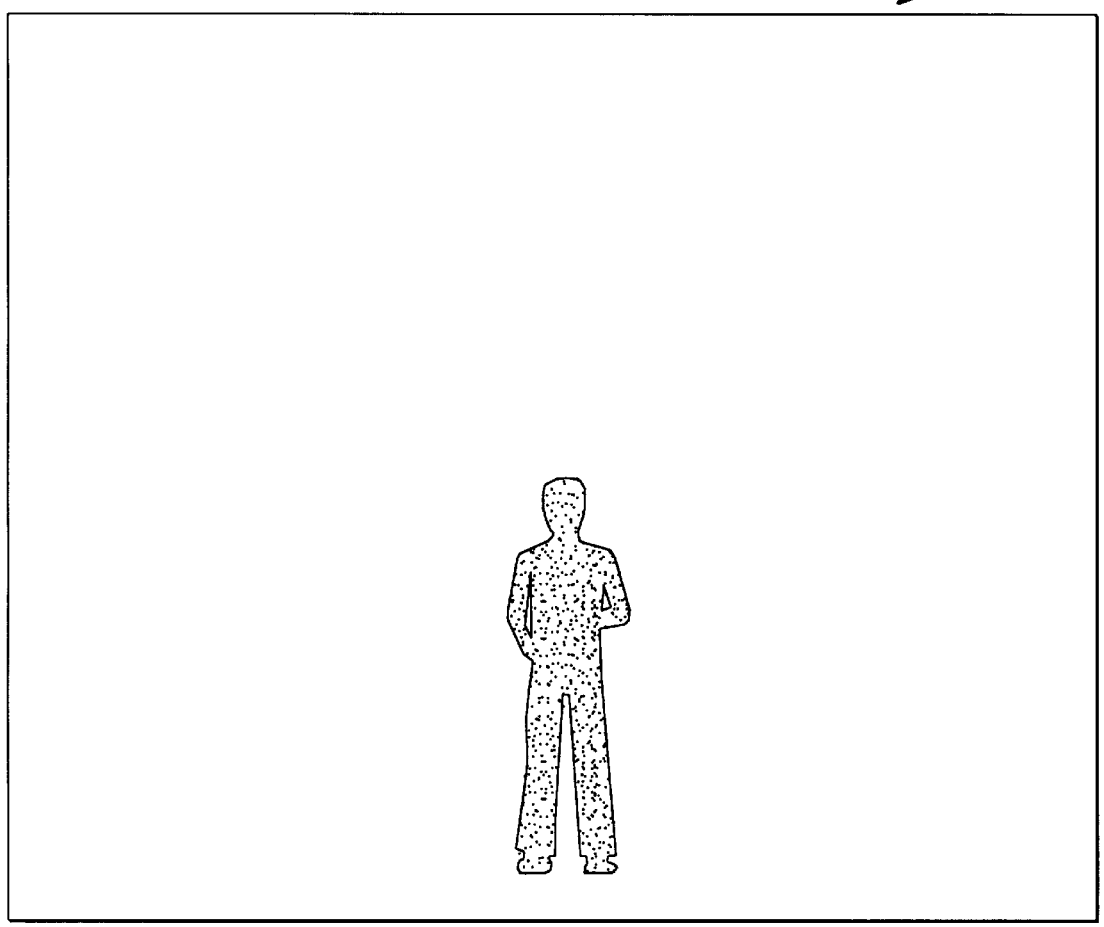
FIG. 5 is an output of the comparator of FIGS. 1 and 4.

The video output of the IR camera 24 is applied to an optional thresholding comparator circuit 30 (a schematic representation of which is shown in FIG. 4). As described in detail below, the comparator threshold may be selected so that comparator 30 produces one output level (such as a video saturation or "white" level) for all video intensities above the selected threshold, and another output value (such as an absence of video or "black" level) for all video intensities below the selected threshold. The optimal threshold value can be adjusted depending on the particular light levels used in the scene. The output of the comparator may be adjusted, for example, so that all areas of the scene illuminated with IR (such as the brighter areas of IR camera output 42 of FIG. 3) produce a "high" (e.g., "white") level, and all areas of the scene that are not illuminated with IR (such as the darker areas of IR camera output 42 of FIG. 3) produce a low (e.g., "black") level. The comparator 30 provides a two-level output 46 as shown in FIG. 5.

Figure 6:
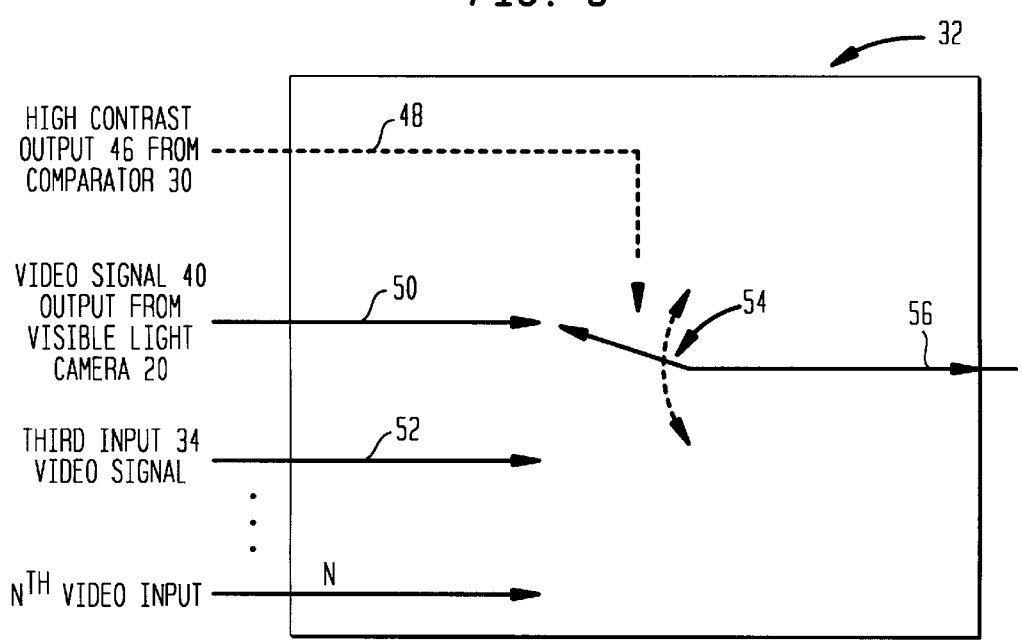
FIG. 6 is a block diagram of the video gate of FIG. 1.

A video gate circuit 32 (a block diagram of which is shown in FIG. 6) receives the output of comparator 30 at a first input 48. A second input 50 to gate circuit 32 is provided by the video output of the visible light camera 20 and may be selectively connected to the gate output. A third input 52 to video gate circuit 32 may be provided by a third video input signal and may be selectively connected to the gate output. The third input may be used as a new background image 34 to replace the image of original background 14. As described below, the threshold circuit output may be used to determine which of the second and third inputs 50, 52 is connected to the gate output 56.

Alternatively, the IR light source 18 may illuminate a foreground object and a visible light source 16 may illuminate both the foreground object and background object. If the background object is a sufficient distance from the foreground object, the IR light will be attenuated enough for successful thresholding. The background object, which will be a dark image in the IR camera output, may then be keyed out. One example where this may be useful is a picture phone user who does not wish the other party to observe the user's background. An IR source, such as a incandescent bulb, illuminate the user's face (near the picture phone) with IR light but illuminates the background (a distance away from the picture phone) with little or no IR light. The resulting IR camera image may be used to "key out" the background.

II. The Cameras

In a preferred embodiment, two cameras 20, 24 are used as the image pickup devices for the system 10. These cameras preferably have identical resolution and employ identical lensing systems. In a preferred embodiment, the cameras 20, 24 are Charge Coupled Device (CCD) cameras. This is because modern CCD cameras employ imaging elements that are simultaneously sensitive to both visible and infrared light energy. Thus, a typical CCD visible light camera contains a built-in IR filter disposed in front of the CCD element to limit the amount of infrared light entering the camera. In the present invention, a standard CCD camera having an IR filter in place may be used as the visible light camera 20 (in which case IR blocking filter 22 is contained within the camera), and a standard CCD camera with its IR blocking filter removed and replaced with a visible light blocking filter, may be used as the IR camera 24. A suitable camera may be the CI20 manufactured by Canon. Alternatively, the IR camera 24 may be an IR spectrum camera, the camera having similar resolution and imaging parameters as the visible light camera. A suitable IR spectrum camera may be CI20R manufactured by Canon.

Figure 1A:
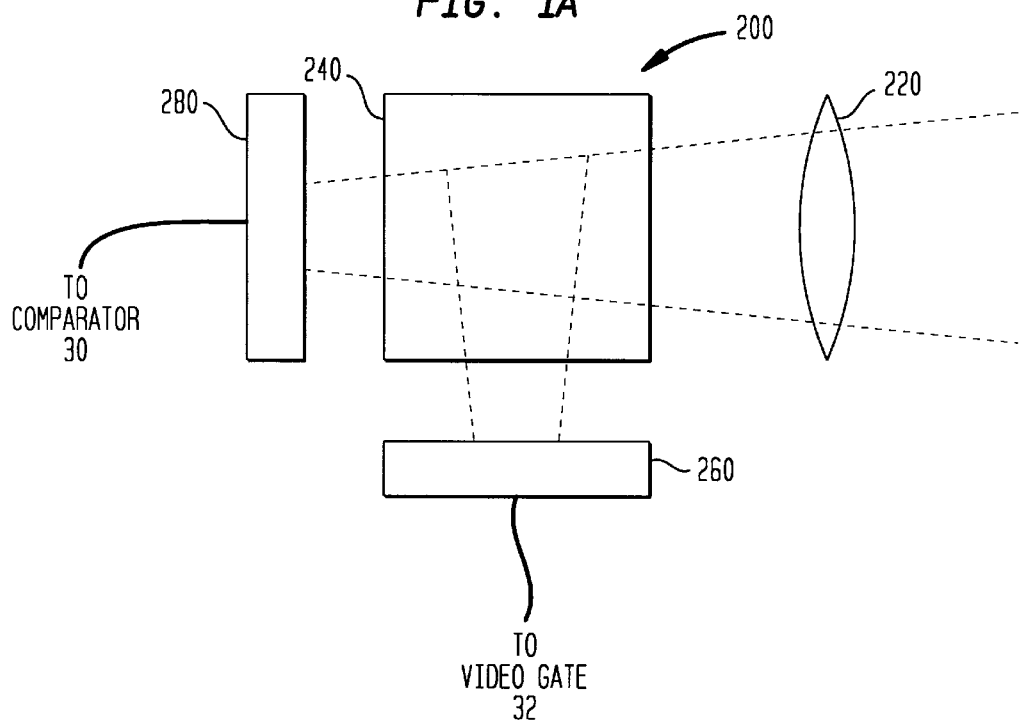
FIG. 1A illustrates a camera according to a preferred embodiment of the present invention.

In a second preferred embodiment of the inventive background extraction technique according to the present invention, the cameras 20, 24 and the beam splitting mirrors 28, 29, and filtering objects 22, 26 may be replaced by a single camera optical system shown in FIG. 1A.

In FIG. 1A, light from a scene having a combined infrared/visible light beam enters a camera 200 at lens system 220. This lens system 220 is preferably a multi-element optical system, but is represented for simplicity in FIG. 1A as a single double-convex lens element. The incoming light is separated by an optical splitter 240. The optical splitter 240 may comprise any suitable optical splitting devices such as, for example, dichroic mirror assemblies, beam-splitting prisms, and/or mirrors or combinations of these elements. In any event, the optical splitter 240 splits the incoming light so that visible light from the scene is imaged onto an optical sensor 260 (such as a visible-light only sensor or sensor system) and all infrared light (or other out-of-visible light spectra energy) is imaged onto an infrared sensor 280. The output of the optical light sensor 260 is directed to the video gate 32 and the output of the infrared light sensor 280 is directed to the comparator 30, as described above with reference to FIG. 1.

III. The Comparator

FIG. 4 is a schematic diagram of the comparator 30. A first input of the comparator 30 receives the output of the infrared light camera 24 (or infrared light sensor 280). A second input of the comparator 30 receives a reference value. This reference value may be a voltage supplied, for example, by a variable voltage supply 44. The variable voltage supply 44 provides a voltage which may be adjusted in order to set the comparator threshold to a value so that a high contrast may be provided between pixels representing images illuminated with a threshold amount of infrared light and pixels representing images not illuminated with this threshold amount of infrared light. Thus, pixels representing an image illuminated with infrared light produce a high (e.g., "white") level and pixels representing images not illuminated by infrared light produce a low (e.g., "black") level.

The comparator's operation is synchronized with the input video signal in a well known manner such that it operates only on the active video portion of each horizontal scan line.

FIG. 5 shows the resulting image output 46 from the comparator. As can be seen, the background (which was illuminated with infrared light) is white and the foreground (which was not illuminated with infrared light) is black. This image is used by the video gate to key the object extraction, as is described below.

IV. The Video Gate

FIG. 6 is a block diagram of the video gate. The video gate 32 has several inputs. The first input 48 is the high contrast output 46 from the comparator 30. The second input 50 is the video signal output 40 from the visible light camera 20 (or visible light sensor 260). Additional video inputs may also be provided. For example, a third video input 34 may be provided to a third input 52 of the video gate 32. This third input may be provided from another video source, such as a live feed from another video camera, a prerecorded video source, or other graphical image. Of course, the video gate may receive any number of inputs. (Inputs 48, 50, 52 . . . N are shown.) The video gate includes a video switch 54 which selectively chooses the video signal to be output by the gate 32. The first input 48 is connected to the switch 54. The second and third inputs 50, 52 are selectively connected to an output 56 via the switch 54.

For example, if the scene is to be output having both the first object 12 and second object 14, the video signal output from the visible light camera 20 is connected to the video switch 54 without modification. Alternatively, if the video signal is desired to have the first object 12 superimposed over a different background, the gate uses the high contrast output 46 to activate the switch 54 to extract the pixels to be removed and output the pixels to be included. The pixels representing the first object 12 are selected for output. These selected pixels are superimposed over another video signal, such as the video signal 34 on third input 52.

Note that in FIG. 6 the video signals 34, 40, 46 on all three inputs are synchronized such that their significant timing references (e.g., vertical retrace and horizontal blanking intervals) occur contemporaneously. Digital storage, or frame buffer techniques, can be used to guarantee this alignment as is well known in the prior art. Gate circuit 32 is also synchronized so that it is active only during the active scan time of the video signals and not during the vertical retrace and horizontal blanking intervals, as is also well known in the prior art. A suitable video gate 32 may be the SE260A manufactured by Dyhair Electronics, Inc.

The video switch 54 is controlled by the video level on input 48. If the second object 14 is to be extracted and replaced with a different image (such as third video image 34), the video gate 32 operates in the following manner. If a high level input (e.g., "white") is applied to input 48, switch 54 connects input 52 (the third video image 34) to the output 56. If a low level video signal (e.g., "black") is applied to input 48, switch 54 connects input 50 (the visible light camera 20 output 40) to the output 56.

Alternatively, a foreground object to be retained may be illuminated with infrared light (such as a face of the picture phone user described above). If the background is to be extracted, when a high level input is applied to input 48, the switch 54 connects input 50 (the visible light camera 20 output 40) to the output 56. When a low level input is applied, switch 54 connects input 52 (the third video image 34) to the output 56.

Figure 7:
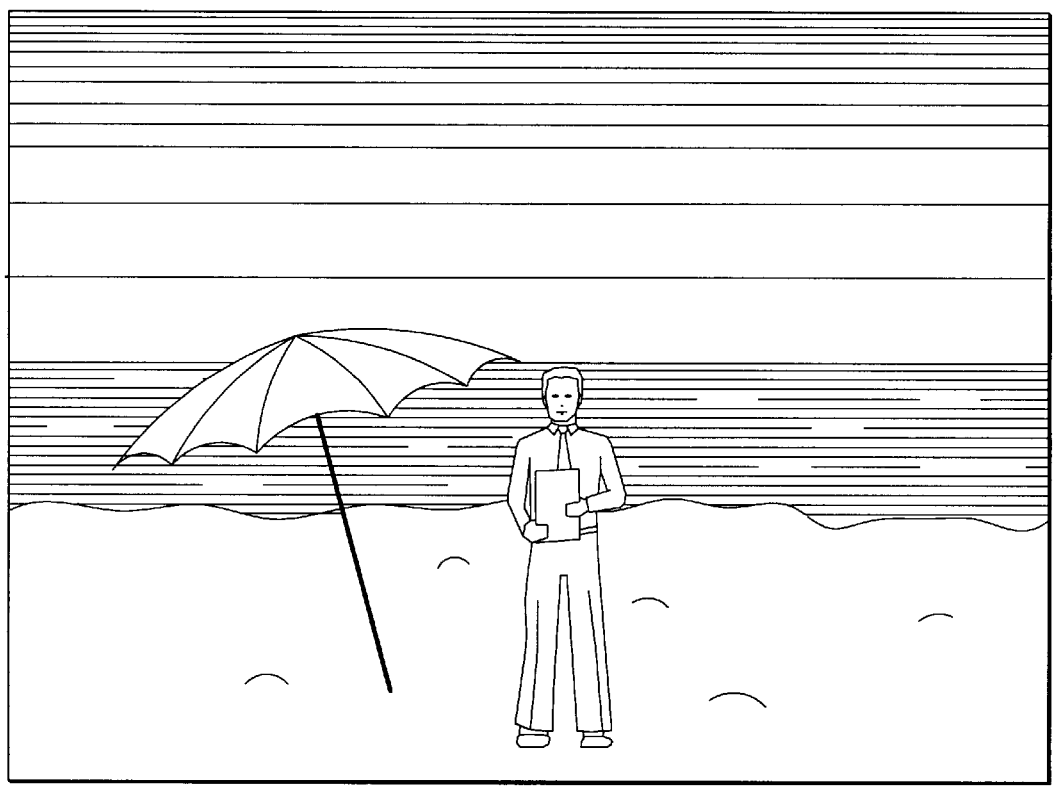
FIG. 7 illustrates an output of the video gate.

FIG. 7 illustrates an output of the gate circuit wherein the first object 12 is superimposed over a new background image 34. Note that the first object 12 is superimposed on a pixel-by-pixel basis with new background from third video image 34.

V. Conclusion

Background extraction in a video picture is disclosed which has many advantages over the prior art. Some of these advantages are:

no "blue screen" or specially prepared studio is required;

the color scheme of the foreground object is not limited;

teleconferees can select to see (or not see) any other conferee's natural background without limiting any other conferee's background selection.

teleconference or picture phone user may prevent the user's background from being viewed by others.

The above described embodiments of the invention are intended to be illustrative only. Numerous alternative embodiments may be devised by those skilled in the art without departing from the spirit and scope of the following claims.

I claim:

1. A method for object extraction in a video picture, comprising the steps of:
    a. illuminating a first object with light having a first wavelength spectrum;
    b. illuminating a second object with the first wavelength spectrum light and a light having a second wavelength spectrum, the first and second wavelength spectra being different;
    c. taking a video image of the first and second objects using a first wavelength spectrum light sensor and a second wavelength spectrum light sensor;
    d. using an output of the second wavelength spectrum light sensor as a mask, extracting from the video image of the first wavelength light spectrum sensor one of the first and the second objects and retaining the other one of the first and the second objects;
    e. providing a third video image.; and
    f. after the step of extracting, combining a video image of the retained object and the third video image.

2. A method for object extraction in a video picture, comprising the steps of:
    a. illuminating a first object with light having a first wavelength spectrum;
    b. illuminating a second object with the first wavelength spectrum light and a light having a second wavelength spectrum, the first and second wavelength spectra being different;
    c. taking a video image of the first and second objects using a first wavelength spectrum light sensor and a second wavelength spectrum light sensor;
    d. using an output of the second wavelength spectrum light sensor as a mask, extracting from the video image of the first wavelength light spectrum sensor one of the first and the second objects and retaining the other one of the first and the second objects; the method further comprising after the step of taking a video image of the first and second objects using the second wavelength spectrum light sensor;
    e. thresholding the output of the second wavelength spectrum light sensor; and
    f. using the thresholded output as the mask.

3. The method of claim 2, wherein the step of thresholding further comprises:
    a. comparing the second wavelength spectrum light sensor output to a threshold value;
    b. setting all pixels having a value lower than the threshold value to a first level; and
    c. setting all pixels having a value higher than the threshold value to a second level.

4. The method of claim 3, further comprising selecting the first level to be a video black level and setting the second level to be a video white level.

5. The method of claim 3, wherein the step of combining further comprises:
    a. providing a third video image;
    b. when a pixel having the first level is received, switching in a corresponding pixel from the third video image; and
    c. when a pixel having the second level is received, switching in a corresponding pixel from an output of the first wavelength spectrum light sensor.

6. The method of claim 3, wherein the step of combining further comprises:
    a. providing a third video image;
    b. when a pixel having the second level is received, switching in a corresponding pixel from the third video image; and
    c. when a pixel having the first level is received, switching in a corresponding pixel from an output of the first wavelength spectrum light sensor.

7. The method of claim 2, further comprising the step of extracting from the first wavelength spectrum light sensor output pixels corresponding to pixels in the mask having a predetermined value.

8. The method of claim 7, further comprising replacing extracted pixels with corresponding pixels from a third video image.

9. The method of claim 1, further comprising the steps of:
    a. selecting the first wavelength spectrum light to be visible light; and
    b. selecting the second wavelength spectrum light to be infrared light.

10. A video object extraction system, comprising:
    a. a first wavelength spectrum light sensor configured to take a video image of a scene including an object;
    b. a second wavelength light spectrum source configured to illuminate the object;
    c. a second wavelength spectrum light sensor configured to take a video image of the scene including the object;
    d. a comparator connected to receive an output of the second wavelength spectrum light sensor and to output a mask signal corresponding to detection of second wavelength spectrum light in the scene; and
    e. a video gate connected to receive the mask signal and an output of the first wavelength spectrum light sensor and to selectively connect the output of the first wavelength spectrum light sensor to an output of the video gate in response to the mask signal.

11. The system of claim 10, wherein:
   a. the first wavelength spectrum light sensor is a visible light sensor;
   b. the second wavelength spectrum light source is an infrared light source; and
   c. the second wavelength spectrum light sensor is an infrared light sensor.

12. The system of claim 11, wherein the infrared light source further comprises an infrared light pass filter.

13. The system of claim 10, further comprising a first wavelength spectrum light source configured to illuminate a second object.

14. The system of claim 13, wherein the first wavelength spectrum light source is a visible light source having an infrared light blocking filter.

15. The system of claim 10, wherein the first wavelength spectrum light sensor is a CCD camera sensitive to visible light and having an infrared light filter.

16. The system of claim 10, wherein the second wavelength spectrum light sensor is a CCD camera sensitive to infrared light and having a visible light filter.

17. The system of claim 10, further comprising a beam splitter disposed between the first wavelength spectrum light sensor and the second wavelength spectrum light sensor.

18. The system of claim 17, wherein the beam splitter comprises a combination of an optical beam splitter and an inverting mirror.

19. The system of claim 10, wherein the comparator further includes a first input configured to receive the output of the second wavelength spectrum light sensor and a second input configured to receive a reference value.

20. The system of claim 19, wherein the reference value is a voltage and, further comprising a variable voltage source connected to the second input.

21. The system of claim 10, wherein the comparator is configured to set an output pixel to a first level if a corresponding pixel from the second wavelength spectrum light sensor output is above a threshold value and to set the output pixel to a second level if the corresponding pixel from the second wavelength spectrum light sensor output is below the threshold value.

22. The system of claim 10, wherein the video gate comprises:
   a. a first input configured to receive the mask signal;
   b. a second input configured to receive the output of the first wavelength spectrum light sensor;
   c. a third input configured to receive a third video image;
   d. an output; and
   e. a switch responsive to the first input for selectively connecting one of the second and third inputs to the output.

23. The system of claim 10, wherein the first wavelength spectrum light sensor and the second wavelength spectrum light sensor are a single unit.

24. The system of claim 23, wherein the single unit includes a lens system configured to receive the first and second wavelength spectrum light, an optical beam splitter configured to direct first wavelength spectrum light to a first wavelength spectrum light sensor and to direct a second wavelength spectrum light to a second wavelength spectrum light sensor.

* * * * *